April 8, 1947.    H. M. HUGE    2,418,640

FREQUENCY CHANGER

Filed May 6, 1943

INVENTOR.
HENRY MARTIN HUGE
BY
*Hoodling and Krost*
ATTORNEYS.

Patented Apr. 8, 1947

2,418,640

UNITED STATES PATENT OFFICE 2,418,640

FREQUENCY CHANGER

Henry M. Huge, Lorain, Ohio, assignor of one-half to Closman P. Stocker and one-half to E. M. Heavens Application May 6, 1943, Serial No. 485,832

14 Claims. (Cl. 172—281)

This invention relates to frequency changers and in particular to a frequency divider using biased saturable inductances to produce self-starting subharmonic oscillations.

The invention provides new and improved means for supplying an output frequency which is an even subharmonic of the input frequency, for assuring self-starting oscillations, for balancing the input frequency out of the output, and for increasing the efficiency and stability of conversion.

An object of my invention is to use a bridge circuit to balance the input frequency out of the output voltage and to balance the output frequency out of the source of biasing current.

Another object of my invention is to start subharmonic oscillations without a starting transient.

A further object is to increase the efficiency of a frequency divider supplying an output frequency which is an even subharmonic of the input frequency.

Another object of my invention is to separate the input and output frequencies by the use of balanced windings on magnetic cores in conjunction with a unidirectional biasing flux in said magnetic cores.

Figure 1:
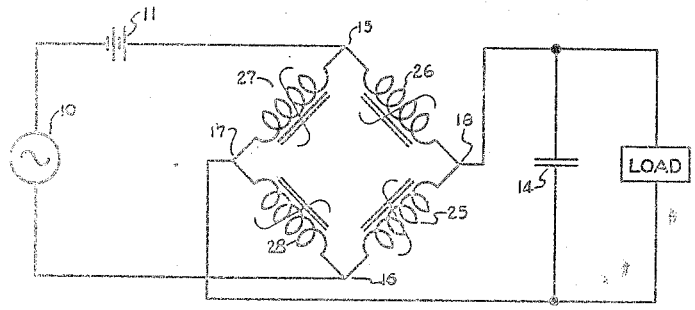

Other objects and a better understanding of my invention may be had by reference to the following specification and claims in connection with the accompanying drawings in which Figure 1 is a circuit diagram of an embodiment of my invention showing a bridge circuit and a source of direct current for supplying bias.

Figure 2:
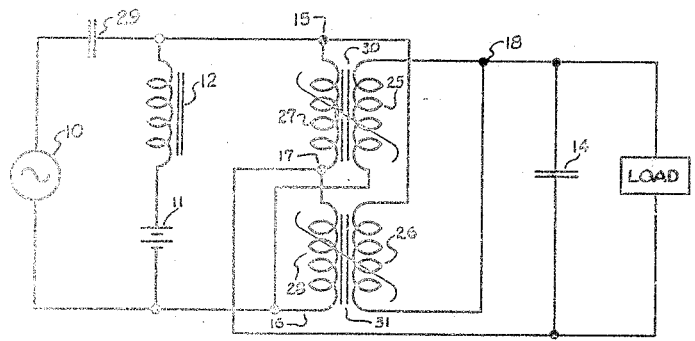
Figure 3:
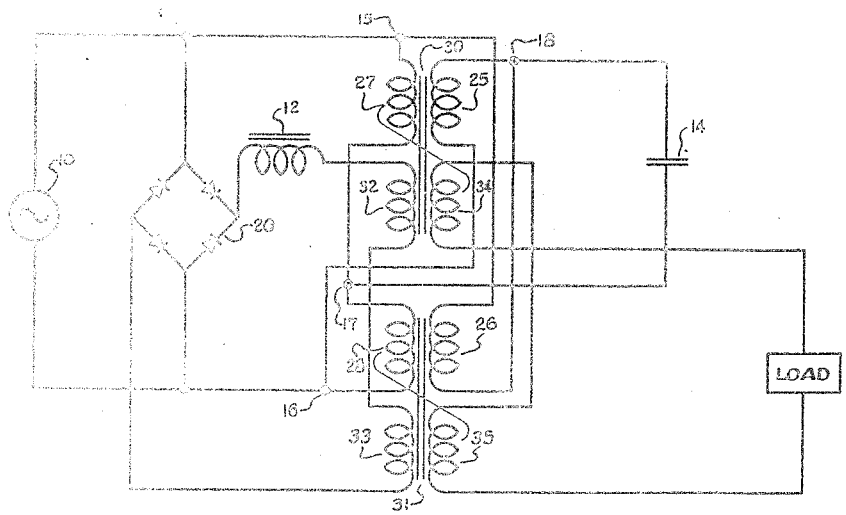

Figure 2 is a modification of the circuit of Figure 1 in which the elements of the bridge circuit are arranged on two cores and in which a different biasing arrangement is used, and Figure 3 is a modification of the circuit of Figure 2 using a rectifier bridge to furnish the biasing current and having insulated output windings.

In general the frequency changer of this invention utilizes biased saturable inductances together with a capacitor in a circuit producing even subharmonics of the input frequency. In the working of my invention I control the phase relationship between the subharmonic voltage and the input voltage appearing across the saturable inductances to produce a negative resistance of the proper value to maintain the oscillations and to hold the output voltage substantially constant.

Referring now to Figure 1, there is shown a source of alternating current 10 in series with a source of direct current 11 supplying the input terminals 15 and 16 of the bridge made up of the four saturable inductances 25, 26, 27, and 28. I prefer to construct the four inductances substantially alike so the output terminals 17 and 18 of the bridge, to which capacitor 14 is connected, are at substantially the same potential as far as the sources 10 and 11 are concerned. That is, when all four inductances are equally saturated, no coupling exists between the input terminals 15 and 16 and the output terminals 17 and 18. The voltage which appears across capacitor 14 results from an instantaneous difference in saturation of the inductances 27 and 28 and a difference between 25 and 26. This difference in saturation produces coupling between the input and output terminals and produces a transfer of energy from the input to the output circuit. The difference is referred to as instantaneous because it is not generally constant, but goes through a cyclic change, at one part of the cycle the saturation of inductance 25 and 27 being greater, at another part of the cycle less than the saturation of inductances 26 and 28.

The voltage across capacitor 14 therefore normally includes very little voltage from source 10 and very little unidirectional voltage from source 11. However, the superposition of both alternating and unidirectional flux in the saturable inductances produces, for certain values of capacitor 14, a negative resistance to the flow of subharmonic current through capacitor 14, and under this condition, subharmonic oscillations start and increase in magnitude until they reach a value determined by the saturation of the saturable inductances together with the value of capacitor 14. The circuit arrangement is such that with the direct current bias applied as shown, no appreciable coupling exists from the input to the output terminals as the result of the voltage of source 10 and the biasing current but the bias causes a coupling to exist from the output to the input terminals, and it is through this coupling that the negative resistance to the subharmonic frequency is produced.

Because of the substantially balanced magnetic core and winding arrangement, the subharmonic current does not flow through the alternating and direct current sources 10 and 11.

The elimination of subharmonic current from the input circuit frequently represents an advantage in itself, particularly where this current might produce an adverse effect on the source 10 or the source 11. In addition, resistance in the input circuit does not produce subharmonic losses, therefore the frequency changer gains in efficiency because of the balanced arrangement.

The circuit of Figure 1 is best adapted to supply the load with voltage of a frequency which is one-half the frequency of source 10. Used as a frequency halving arrangement, the circuit of Figure 1 supplies the load with a voltage of low harmonic content and with this arrangement I am able to maintain a substantially constant load voltage for all normal values of load and for a wide range of voltages from source 10. When the load impedance becomes too small to enable the frequency changer to maintain the operating value of load voltage, the oscillations may become intermittent, but when the load impedance is increased to a normal value, the operating value of load voltage is again maintained.

The highly desirable load carrying characteristic just described results from the fact that in my frequency changer I am able to produce in response to a change in load, a shift in phase between the subharmonic voltage and the voltage of the input frequency across each of the saturable inductances and am thereby able with each increase in load, to increase the power converted from the input to the subharmonic frequency by the proper amount to maintain a substantially constant load voltage.

In the circuit of Figure 1, the bridge is symmetrical, and the voltage across inductance 27 is the same as that across inductance 25, and similarly, the voltage across inductance 28 is the same as that across inductance 26. Because of this symmetry, these four inductances can be wound on only two cores as shown in Figure 2.

The term "inductance" as here used does not exclude the possible use of the inductance windings as a transformer, but implies that the action of the element depends on its exciting current. This contrasts with the term "transformer" which usually implies that the exciting current is merely incidental to the function of the element.

Besides showing saturable inductances 25 and 27 wound on a common core 30 and saturable inductances 26 and 28 wound on a common core 31, Figure 2 differs from Figure 1 in the method of biasing the saturable inductances. The source of direct current 11 in Figure 2 is shown in parallel with the alternating current source 10 with inductance 12 in series with source 11 to sustain the voltage of source 10 in the parallel branch. Capacitor 20 blocks the direct current of source 11 from alternating current source 10.

The advantage of the common core construction of Figure 2 over the bridge arrangement of Figure 1 is chiefly an advantage of economy. The common core arrangement accomplishes with two large saturable inductances what the bridge arrangement does with four smaller inductances, and in general this results in economy of both space and cost. The interconnection of the inductances 25, 26, 27, and 28 and the connection of capacitor 14 are the same in Figure 2 as in Figure 1 and the operation of the frequency changer is also substantially the same.

Figure 3 is a circuit diagram of an arrangement using rectifiers to supply the direct current bias for cores 30 and 31.

The rectifier bridge 20 is energized with alternating current from source 10 and supplies direct current through inductance 12 to windings 32 and 33 in series, providing a unidirectional flux in cores 30 and 31 as produced by source 11 in Figure 2. Windings 32 and 33 are preferably made with a substantially equal number of turns. Inductance 12 serves to sustain the voltage from source 10 induced in windings 32 and 33. Although the biasing current from the bridge 20 is supplied to the insulated windings 32 and 33, these windings are polarized to produce the same polarity bias as that produced in Figures 1 and 2.

Inductances 25, 26, 27, and 28 and capacitor 14 are connected in the same manner in Figure 3 as in Figures 1 and 2, and the circuit operation is substantially as described previously. In order to insulate the load from source 10 and provide any desired output voltage of the subharmonic frequency, windings 34 and 35 are provided on saturable cores 30 and 31 respectively. These windings are preferably made with substantially equal turns and their connection is polarized to provide the load with the same wave shape as that across capacitor 14, therefore voltage of the frequency of source 10 is substantially balanced out of the load voltage, and, as in Figures 1 and 2, the subharmonic current and voltage do not appear in the input circuit. The balanced arrangement therefore assures that no appreciable subharmonic losses will occur in inductance 12 or the rectifier bridge 20.

While only particular forms of my invention are shown in the accompanying drawings my invention contemplates the use of at least two magnetic cores with winding connections arranged to balance out of the secondary any voltage introduced into the primary when the cores are equally magnetized. It will also be apparent to those skilled in the art that some modification using a three legged core may be adapted to practice my invention.

Although I have described my invention with a certain degree of particularity, it is to be understood that the present disclosure has been made only by way of example and that numerous changes in the details of construction and the combination and arrangement of parts may be resorted to without departing from the spirit and scope of the invention as hereinafter claimed.

I claim as my invention:

1. A magnetic frequency divider comprising in combination four saturable inductances arranged as a bridge circuit having two pairs of terminals designated as input and output terminals, a source of alternating current in series with a source of direct current connected to the input terminals of said bridge circuit, and a capacitor connected to the output terminals of the bridge circuit, said saturable inductance bridge in cooperation with said capacitor producing across said output terminals voltage of a frequency which is an even subharmonic of the frequency of said source of alternating current.

2. A frequency changer adapted to be energized by a source of alternating current comprising in combination, saturable inductance means having two pairs of terminals designated as input and output terminals, said saturable inductance means made up of a plurality of inductances connected in a substantially balanced arrangement producing a balanced condition between said input and said output terminals, the coupling between said input and output terminals being produced by instantaneous differences in saturation between different members of said plurality of saturable inductances, circuit means supplying direct current to said saturable inductance means, a capacitor connected to said output terminals, and output circuit means adapted to supply a load with power at a frequency which is an even subharmonic of the frequency of said source of alternating current when said input terminals are energized from said source of alternating current.

3. A self-starting frequency divider adapted to be energized by a source of alternating current, comprising in combination, a plurality of saturable inductances arranged in a balanced combination having a pair of input terminals and a pair of output terminals, the coupling between said input and output terminals being produced by instantaneous differences in the saturation of different members of said plurality of saturable inductances, biasing means producing unidirectional flux in said saturable inductances, a capacitor connected to said output terminals, said balanced combination when energized at its input terminals by said source of alternating current producing in cooperation with said capacitor and biasing means, a voltage of a frequency one-half the frequency of said source across said output terminals.

4. In combination, a plurality of saturable inductances arranged in a balanced combination having a pair of input terminals and a pair of output terminals, biasing means producing unidirectional flux in said saturable inductances and producing coupling from said output terminals to said input terminals, a capacitor connected across said output terminals and a source of alternating current connected to said input terminals, said combination producing across said output terminals voltage of a frequency which is an even subharmonic of the frequency of said source of alternating current.

5. A frequency changer comprising in combination, first and second substantially equal magnetic core means, first, second, third, and fourth substantially equal winding means, said first and third winding means being on said first core means, said second and fourth winding means being on said second core means, said winding means being connected in series with each other in numerical order in a closed loop, the first winding means being connected to the fourth and the second, the third winding means being connected to the second and the fourth, a capacitor, said capacitor being connected from the junction between the first and second winding means to the junction between the third and fourth winding means, circuit means adapted to supply both alternating current and direct current to said winding means, said circuit means being connected on one side to the junction between the fourth and the first winding means, and on the other side to the junction between the second and the third winding means, said frequency changer being adapted to supply a load substantially in parallel with said capacitor with voltage of a frequency which is an even subharmonic of the frequency of the alternating current supplied to said winding means.

6. A self-starting frequency divider adapted to be energized by a source of alternating current, comprising in combination, a plurality of saturable inductances arranged in a balanced combination having a pair of input terminals and a pair of output terminals, the coupling between said input and output terminals being produced by instantaneous differences in the saturation of different members of said plurality of saturable inductances, biasing means producing unidirectional flux in said saturable inductances, a capacitor connected to said output terminals, said balanced combination when energized at its input terminals by said source of alternating current producing in cooperation with said capacitor and biasing means, a voltage of a frequency one-half the frequency of said source across said output terminals, circuit means adapted to supply a load substantially in parallel with said capacitor.

7. In combination, a plurality of saturable inductances arranged in a balanced combination having a pair of input terminals and a pair of output terminals, biasing means producing unidirectional flux in said saturable inductances and producing coupling from said output terminals to said input terminals, a capacitor connected across said output terminals and a source of alternating current connected to said input terminals, said combination producing across said output terminals voltage having a component of a frequency which is an even subharmonic of the frequency of said source of alternating current.

8. A frequency changer comprising in combination, first and second substantially equal magnetic core means, first, second, third, and fourth substantially equal winding means, said first and third winding means being on said first core means, said second and fourth winding means being on said second core means, said winding means being connected in series with each other in numerical order in a closed loop, the first winding means being connected to the fourth and the second, the third winding means being connected to the second and the fourth, a capacitor, said capacitor being connected from the junction between the first and second winding means to the junction between the third and fourth winding means, circuit means adapted to supply both alternating current and direct current to said winding means, said circuit means being connected on one side to the junction between the fourth and the first winding means, and on the other side to the junction between the second and the third winding means, said circuit means comprising a source of alternating current in parallel with a source of direct current, with a direct current blocking condenser in series with the source of alternating current and an alternating current blocking inductance in series with the source of direct current, said frequency changer being adapted to supply a load substantially in parallel with said capacitor with voltage of a frequency which is an even subharmonic of the frequency of the alternating current supplied to said winding means.

9. A frequency changer adapted to be energized by a source of alternating current, comprising in combination, a plurality of saturable inductances connected in a substantially balanced combination having a pair of input terminals and a pair of output terminals, coupling between said input terminals and said output terminals being produced by instantaneous differences in saturation between different members of said plurality of saturable inductances, a capacitor connected to said output terminals, a rectifier adapted to be energized by said source of alternating current and to supply biasing current to said plurality of saturable inductances, said frequency changer when energized by said source of alternating current producing across said output terminals voltage of a frequency which is an even subharmonic of the frequency of said source of alternating current.

10. A frequency changer adapted to be energized by a source of alternating current, comprising in combination, a plurality of saturable inductances connected in a substantially balanced combination having a pair of input terminals and a pair of output terminals, coupling between said input terminals and said output terminals being produced by instantaneous differences in saturation between different members of said plurality of saturable inductances, a first capacitor connected across said output terminals, a substantially linear inductance in series with a second capacitor in a series combination, said series combination being connected substantially in parallel with said first capacitor, a capacitor connected to said output terminals.

11. A frequency changing device comprising input and output branches, a plurality of saturable inductances having winding means, a capacitor and unidirectional flux biasing means, said winding means being connected to form a bridge with input and output branches, said capacitor being connected in closed circuit relation with said output branch, said biasing means connected to produce a unidirectional flux condition in said saturable inductances, said capacitor and biasing means cooperating with the saturable inductances to produce in said device a negative resistance, said negative resistance producing oscillations of changed frequency when said input branch is energized by an alternating current source.

12. A frequency changing device comprising input and output branches, a plurality of saturable inductances having winding means, a capacitor, and direct current biasing means, said winding means being connected to form a bridge with input and output branches, said capacitor being connected in closed circuit relation with said output branch, said biasing means connected to produce a unidirectional flux condition in said saturable inductances, said capacitor and biasing means cooperating with the saturable inductances to produce oscillations of changed frequency in said output branch when said input branch is energized with alternating current.

13. A frequency reducer comprising saturable inductance means having a plurality of windings connected in a substantially balanced circuit having an input and an output branch, a capacitor connected to said output branch, and unidirectional flux biasing means for producing a unidirectional flux in the saturable inductance means to provide coupling from the output branch to the input branch of the substantially balanced circuit, said capacitor and biasing means cooperating with the saturable inductance means to produce oscillations of reduced frequency in said output branch when the input branch is energized with alternating current.

14. A frequency changer comprising saturable inductance means having a plurality of windings connected in a substantially balanced circuit having an input and an output branch, a capacitor connected to said output branch, and a source of unidirectional biasing current connected in said input branch, said capacitor and biasing current source cooperating with the saturable inductance means to produce oscillations of changed frequency in the output branch when the input branch is energized with alternating current.

HENRY M. HUGE.

REFERENCES CITED

The following references are of record in the file of this patent:

UNITED STATES PATENTS

| Number | Name | Date |
| --- | --- | --- |
| 2,272,246 | Manley | Feb. 10, 1942 |